United States Patent
Wei et al.

(10) Patent No.: US 9,198,188 B2
(45) Date of Patent: Nov. 24, 2015

(54) OPERATING A WIRELESS SYSTEM IN AN UNLICENSED BAND

(75) Inventors: Bai Wei, Beijing (CN); Chunyan Gao, Beijing (CN); Haiming Wang, Beijing (CN); Na Wei, Beijing (CN); Jing Han, Beijin (CN); Hong Wei, Beijing (CN)

(73) Assignee: BROADCOM CORPORATION, Irvine, CA (US)

( * ) Notice: Subject to any disclaimer, the term of this patent is extended or adjusted under 35 U.S.C. 154(b) by 128 days.

(21) Appl. No.: 14/002,407

(22) PCT Filed: Mar. 1, 2011

(86) PCT No.: PCT/CN2011/071429
§ 371 (c)(1),
(2), (4) Date: Aug. 30, 2013

(87) PCT Pub. No.: WO2012/116489
PCT Pub. Date: Sep. 7, 2012

(65) Prior Publication Data
US 2013/0336156 A1 Dec. 19, 2013

(51) Int. Cl.
*H04W 72/00* (2009.01)
*H04W 72/08* (2009.01)
*H04L 5/00* (2006.01)
*H04L 27/20* (2006.01)
*H04W 16/14* (2009.01)

(52) U.S. Cl.
CPC ............ *H04W 72/085* (2013.01); *H04L 5/001* (2013.01); *H04L 27/2032* (2013.01); *H04W 16/14* (2013.01); *H04L 5/0091* (2013.01)

(58) Field of Classification Search
CPC .................................................. H04W 72/085
See application file for complete search history.

(56) References Cited

U.S. PATENT DOCUMENTS

| 7,512,094 | B1 | 3/2009 | Linebarger et al. | |
|---|---|---|---|---|
| 2009/0143019 | A1* | 6/2009 | Shellhammer | 455/67.11 |
| 2009/0257387 | A1* | 10/2009 | Gholmieh et al. | 370/329 |
| 2011/0300891 | A1* | 12/2011 | Deb et al. | 455/510 |
| 2012/0039183 | A1* | 2/2012 | Barbieri et al. | 370/241.1 |
| 2012/0135770 | A1* | 5/2012 | Sun et al. | 455/509 |
| 2012/0147831 | A1* | 6/2012 | Golitschek | 370/329 |
| 2012/0314675 | A1* | 12/2012 | Vujcic | 370/329 |
| 2013/0177007 | A1* | 7/2013 | Lee et al. | 370/338 |

FOREIGN PATENT DOCUMENTS

| CN | 101540978 | 9/2009 |
|---|---|---|
| WO | 2010111150 | 9/2010 |
| WO | WO2011007581 A1 * | 1/2011 |
| WO | WO2012078565 A1 * | 6/2012 |

* cited by examiner

*Primary Examiner* — Robert M Morlan
(74) *Attorney, Agent, or Firm* — Oblon, McClelland, Maier & Neustadt, L.L.P.

(57) ABSTRACT

A network access node identifies a component carrier within an unlicensed radio spectrum, determines whether or not to configure the component carrier for use as a secondary component carrier, and based on the determining configures the component carrier for use as a secondary component carrier companion to a primary component carrier within a licensed radio spectrum. In various non-limiting embodiments the network node senses the component carrier within the unlicensed radio spectrum, and as more data is needed to make the determination employs a mobile device to also sense and further to measure the component carrier within the unlicensed radio spectrum. Specific procedures are detailed for both the network node and the mobile device.

22 Claims, 9 Drawing Sheets

The IE *MeasObjectUnlicensedBand* specifies information applicable for measurement/sensing on unlicensed band.

*MeasObjectUnlicensedBand* information element

```
-- ASN1START

MeasObjectUnlicensdBand  ::=         SEQUENCE {
    carrierFreq                      ARFCN-ValueUnlicensedBand,
    allowedMeasBandwidth             AllowedMeasBandwidth,
```

Figure 4a ↑

1.1.1.1 QuantityConfig

The IE *QuantityConfig* specifies the measurement quantities and layer 3 filtering coefficients for E-UTRA and inter-RAT measurements.

*QuantityConfig* information element

```
-- ASN1START quantityConfigUnLicensedBand         QuantityConfigUnlicenseBand     OPTIONAL,    -- Need ON QuantityConfigUnlicensedBand ::=     SEQUENCE {
    MeasQuantityUnlicensedBand       ENUMERATED {common-rssi}

-- ASN1STOP
```

Figure 4b ↑

1.1.1.2 Event A8 (Sensed carrier on unlicensed band becomes better than absolute threshold)

The UE shall:

1> consider the entering condition for this event to be satisfied when condition A9-1, as specified below, is fulfilled;

1> consider the leaving condition for this event to be satisfied when condition A9-2, as specified below, is fulfilled;

Inequality A8-1 (Entering condition)

Figure 4d ↑

1.1.1.3 Event A7 (Neighbour becomes worse than threshold)

The UE shall:

> 1> consider the entering condition for this event to be satisfied when condition A8-1, as specified below, is fulfilled;
>
> 1> consider the leaving condition for this event to be satisfied when condition A8-2, as specified below, is fulfilled;

Inequality A7-1 (Entering condition)

$$Mn + Ofn + Ocn - Hys < Thresh$$

Inequality A7-2 (Leaving condition)

$$Mn + Ofn + Ocn + Hys > Thresh$$

The variables in the formula are defined as follows:

> $Mn$ is the measurement result of the neighbouring cell, not taking into account any offsets.
>
> $Ofn$ is the frequency specific offset of the frequency of the neighbour cell (i.e. *offsetFreq* as defined within *measObjectEUTRA* corresponding to the frequency of the neighbour cell).
>
> $Ocn$ is the cell specific offset of the neighbour cell (i.e. *cellIndividualOffset* as defined within *measObjectEUTRA* corresponding to the frequency of the neighbour cell), and set to zero if not configured for the neighbour cell.
>
> $Hys$ is the hysteresis parameter for this event (i.e. *hysteresis* as defined within *reportConfigEUTRA* for this event).
>
> $Thresh$ is the threshold parameter for this event (i.e. *a4-Threshold* as defined within *reportConfigEUTRA* for this event).
>
> $Mn$ is expressed in dBm in case of RSRP, or in dB in case of RSRQ.

1.1.1.4 Event A9 (Sensed carrier on unlicensed band becomes worse than absolute threshold)

The UE shall:

> 1> consider the entering condition for this event to be satisfied when condition A9-1, as specified below, is fulfilled;
>
> 1> consider the leaving condition for this event to be satisfied when condition A9-2, as specified below, is fulfilled;

Inequality A9-1 (Entering condition)

$$Mn - Hys < Thresh$$

Inequality A9-2 (Leaving condition)

$$Mn + Hys > Thresh$$

Figure 4e

OPERATING A WIRELESS SYSTEM IN AN UNLICENSED BAND

TECHNICAL FIELD

The exemplary and non-limiting embodiments of this invention relate generally to wireless communication systems, methods, devices and computer programs and, more specifically, relate to procedures for component carriers of a carrier aggregation system which utilize unlicensed spectrum.

BACKGROUND

The following abbreviations that may be found in the specification and/or the drawing figures are defined as follows:
  3GPP third generation partnership project
  CA carrier aggregation
  CC component carrier
  CE control element
  CQI channel quality indicator
  CRS cell specific reference signal
  DL downlink (node B towards UE)
  eNB node B/base station in an E-UTRAN system
  E-UTRAN evolved UTRAN (LTE)
  GERAN GSM EDGE Radio Access Network
  GSM global system for mobile communications
  ISM industrial, scientific and medical
  LTE long term evolution
  LTE-A LTE-Advanced
  MAC medium access control
  MME mobility management entity
  PCC primary component carrier
  PRACH physical random access channel
  PSTN public switched telephone network
  RACH random access channel
  RRC radio resource control
  RRM radio resource management
  RS reference signal
  RSRP reference signal received power
  RSRQ reference signal received quality
  RSSI received signal strength indicator
  Scell secondary component carrier
  SOW serving gateway
  SIB system information block
  TDM time division multiplex
  UE user equipment
  UL uplink (UE towards node B/eNB)
  UTRAN universal terrestrial radio access network
  WLAN wireless local area network The LTE-Advanced wireless system is designed to provide enhanced services by means of higher data rates and lower latency with reduced cost. Carrier Aggregation (CA) is one technology to improve data rates. FIG. 1 illustrates the CA concept: the whole bandwidth of the wireless system is divided into two or more component carriers (CCs), of which FIG. 1 shows five CCs by example. At least one CC is configured to serve legacy UEs. Release 10 and later UEs are to be capable of monitoring/using multiple CCs, and so the wireless network is able to assign two or more CCs simultaneously as active for a single UE. This enables the network greater scheduling flexibility by giving it the ability to allocate channels to the same UE on any of the one or more CCs assigned to the UE. For the case that multiple CCs are assigned and active for a UE, one of the assigned CCs will be the UE's primary CC and the other(s) will be secondary CC(s). The UE's secondary CC(s) is/are also sometimes termed an extension carrier.

3GPP LTE Rel-10 uses CCs designated on a licensed band. In an LTE-A system an eNB will configure RRM measurement for a UE in a licensed band, and the UE will report related results used to decide which cell/carrier on the licensed band is good enough to be configured. An RRM measurement is based on a cell specific reference signal (CRS) measurement, but the CRS is transmitted only in the carriers already configured in an LTE system, these carriers being of the licensed band.

For at least this reason, there is no support in the LTE system for carrier aggregation using an unlicensed band. What is needed in the art is a way to intelligently deploy unlicensed spectrum for use in a CA type system. Such a deployment has the potential to reduce operator's cost, improve system throughput, off-load traffic from a licensed band, and improve spectrum efficiency overall. However, it is understood that new efficient measurement and sensing mechanisms, as well as configurations, would be required in order to achieve such potential.

Some discussion for developing the LTE-A standard for shared band access may be seen at a presentation by M-A Phan, H. Wiemann and J. Sachs entitled FLEXIBLE SPECTRUM USAGE—HOW LTE CAN MEET FUTURE CAPACITY DEMANDS (Ericsson; Jul. 8, 2010;) and another by Rui Yang entitled OVERVIEW OF RESEARCH PROJECTS WITH NYU-POLY (InterDigital Communications; Nov. 12, 2010).

SUMMARY

The foregoing and other problems are overcome, and other advantages are realized, by the use of the exemplary embodiments of this invention.

In a first exemplary embodiment of the invention there is an apparatus, comprising at least one processor, and at least one computer-readable memory storing at least one computer program. In this embodiment the at least one memory with the at least one computer program is configured with the at least one processor to cause the apparatus to at least identify a component carrier within an unlicensed radio spectrum, based on the identifying, determine whether or not to configure the component carrier for use as a secondary component carrier, and based on the determining, configure the component carrier for use as a secondary component carrier companion to a primary component carrier within a licensed radio spectrum.

In a second exemplary embodiment of the invention there is an apparatus, comprising: means for identifying a component carrier within an unlicensed radio spectrum, means for determining whether or not to configure the component carrier for use as a secondary component carrier based on the means for identifying, and means for configuring the component carrier for use as a secondary component carrier companion to a primary component carrier within a licensed radio spectrum based on the means for determining.

In a third exemplary embodiment of the invention there is a method, comprising: identifying by a network access node a component carrier within an unlicensed radio spectrum, based on the identifying, determining whether or not to configure the component carrier for use as a secondary component carrier, and based on the determining, configuring the component carrier for use as a secondary component carrier companion to a primary component carrier within a licensed radio spectrum.

In a fourth exemplary embodiment of the invention there is an apparatus, comprising: at least one processor, and at least one computer-readable memory storing at least one computer program, in which the at least one memory with the at least one computer program is configured, with the at least one processor, to cause the apparatus at least to: sense at least one component carrier within an unlicensed radio spectrum and/or measure a measurement reference signal received on a component carrier within an unlicensed radio spectrum from a network access node, send to the network access node results of the sensing and/or measuring, and thereafter receive from the network access node an indication to take the component carrier within the unlicensed radio spectrum into use as a secondary component carrier companion to a primary component carrier within a licensed radio spectrum.

In a fifth exemplary embodiment of the invention there is a method, comprising: performing by a mobile device at least one of sensing a component carrier within an unlicensed radio spectrum and measuring a measurement reference signal received on a component carrier within an unlicensed radio spectrum from a network access node, sending to the network access node results of the at least one of sensing and measuring, and thereafter receiving from the network access node an indication to take the component carrier within the unlicensed radio spectrum into use as a secondary component carrier companion to a primary component carrier within a licensed radio spectrum.

In a sixth exemplary embodiment of the invention there is an apparatus, comprising: at least one of means for sensing a component carrier within an unlicensed radio spectrum and means for measuring a measurement reference signal on a component carrier within an unlicensed radio spectrum from a network access node, means for sending to the network access node results of the at least one of means for sensing and means for measuring, and means for receiving from the network access node an indication to take the component carrier within the unlicensed radio spectrum into use as a secondary component carrier companion to a primary component carrier within a licensed radio spectrum.

These and other embodiments and aspects are detailed below with particularity.

BRIEF DESCRIPTION OF THE DRAWINGS

FIGS. 4a-4e illustrated non-limiting examples of coding which are related to information elements (IE) for RRC messaging and reporting trigger events in accordance with the embodiments of the invention.

DETAILED DESCRIPTION

Figure 1:
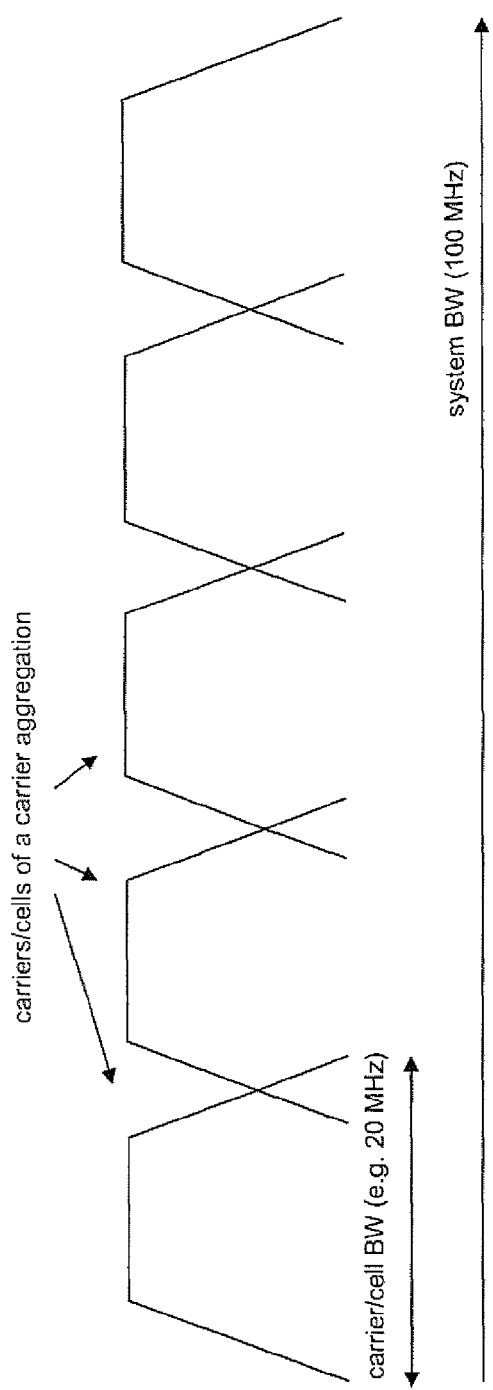
FIG. 1 is a schematic diagram illustrating a wireless system utilizing carrier aggregation, in which there are five component carriers or cells shown for which user equipment might be allocated multiple component carriers/cells simultaneously.

Exemplary embodiments of the invention detailed herein provide solutions and address problems in adapting a CA communication system for usability with an unlicensed spectrum band.

Unlicensed spectrum bands may also be termed shared bands. As an example, the shared bands include the ISM band and the TV white spaces which the US Federal Communications Committee FCC is considering for this use.

Shared bands may be controlled by licensed spectrum systems, and may be used by a stand-alone cell such as a LTE-A femto cell which provides fast access to the Internet in a similar manner to the WLAN specifications at IEEE 802.11. One advantage of using an LTE-A femto cell over a traditional WLAN is the improved spectrum efficiency in LTE-A. This improved spectrum efficiency is realized through such concepts as LTE's flexibility in managing the deployment bandwidth and the number of utilized carriers, and even the LTE's flexibility in reconfiguration of a center frequency.

However, at least one challenge in adopting this shared band concept is the need to manage on communications devices, such as network access nodes (e.g., base stations, relay stations and the like) and/or mobile devices, the increased discovery burden which would be required. Since there are already some local networks deployed in unlicensed bands, for example WiFi, Bluetooth, and Zigbee, the interference in the unlicensed bands can be more variable than interference in a licensed band, such as an LTE licensed band. As the interference situation in these shared bands can change quickly, an access node (e.g., eNB in LTE-A) using a shared band channel would necessarily be required to dynamically avoid the interference.

The related requirements of a communications device to use a shared channel can include avoiding channel interference and in some cases re-deploying the device to a more suitable channel of a shared band. This is especially important during an access node discovery phase. As similarly stated above, these required operations for deploying in the unlicensed band will cause additional operations and processing by the communications device. Further, it is reasonable to expect that a device performing a cellular operation using a shared band, such as an ISM band, would be required to react especially quickly to a changing interference environment of the shared band so as not to allow the cellular communications to be interrupted or a call to drop. For at least these reasons, aggregation of carriers on a licensed band as a FCC is seen to be a more attractive alternative than deploying LTE in a stand alone unlicensed band directly.

Control signaling for unlicensed bands can be sent via a licensed band. To achieve satisfactory data transmission performance and real gain from a carrier aggregation deployment in unlicensed radio spectrums, some interference avoidance and reduction schemes are necessary. One such technique is to evaluate the usability of the band before attempting a data transmission in the unlicensed band. In addition, considering the additional processing required, it would be desirable that such an evaluation be implemented with low complexity.

In accordance with the exemplary embodiments of the invention, one implementation to achieve this preferred low complexity includes reusing the existing mechanisms of an existing communication system as much as possible for assessing the usability of the unlicensed band.

The eNB of an LTE-A system operating in a licensed band will configure RRM measurement to a UE and let the UE report related results so that the eNB can determine which cell/carrier is good enough to be configured. RRM measurement is based on cell specific reference signal (CRS) measurement. Conventionally the CRS is transmitted only in the carriers already configured in an LTE system. Therefore, new efficient measurement and sensing mechanisms are necessary to evaluate the usability of an unlicensed band before the unlicensed band can be used by the LTE system. The exemplary embodiments of the invention address at least these requirements.

Figure 2A:
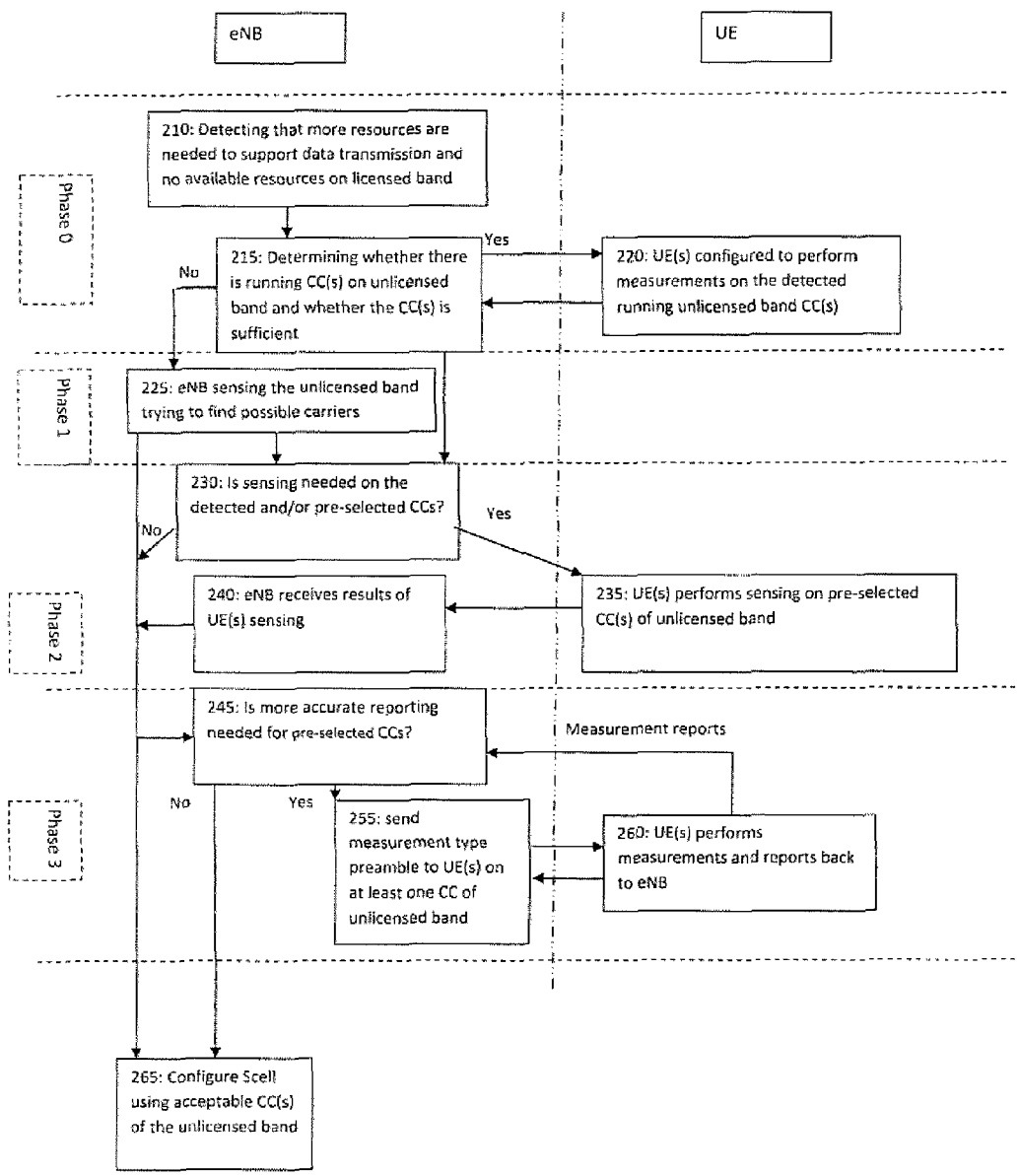
FIG. 2A is a simplified block diagram of a procedure for sensing and measurement of component carriers within an unlicensed band in accordance with the exemplary embodiments of the invention

FIG. 2A illustrates a simplified block diagram of a sensing and measurement procedure, in accordance with the exemplary embodiments of the invention, to find a carrier on an unlicensed band and determine whether the carrier could be used to operate an LTE-A system.

In FIG. 2A the dashed vertical line divides the operations related to the eNB from those of the UE. In certain embodiments at least some of the operations occurring across this line may be performed, at least in part, with one or both of the eNB and the UE. Further, the UE is not limited to a single UE, and the operations in FIG. 2A which are performed may represent operations performed in one or more of a plurality of eNBs and/or UEs.

For clarity of description FIG. 2A is explained with reference to phases 0-3. At block 210 in a Phase 0 of the operations, there is detecting by an eNB that more resources are needed to support data transmission and there are no available or suitable radio resources on the licensed band. At block 215 there is determining whether there is a running CC(s) on the unlicensed band and whether the running CC(s) is sufficient. A running CC means a CC already configured as a primary or a secondary CC for at least one mobile device. If block 215 finds that there is a sufficient running CC(s) on the unlicensed band, then at block 220 the UE(s) is configured to perform measurements on the detected running unlicensed band CC(s). If block 215 concludes that there is not a sufficient running CC(s) on the unlicensed band then the process moves to Phase 1 of the operations. At block 225 the eNB performs its own sensing in the unlicensed band to detect possible component carriers and the eNB pre-selects at least one of these CCs of the unlicensed band. If block 225 is performed then in Phase 2 of the process at block 230 there is determining of whether UE(s) sensing on the detected and/or pre-selected CCs is needed. If at block 230 it is determined that UE sensing on the detected and/or pre-selected CCs is needed then the process proceeds to block 235 where a new measurement object and trigger is defined and sent to the UE for reporting. The reporting by the UE is based on at least one new trigger event such that reporting by a particular UE is "on" when that particular UE senses that a particular carrier becomes better than a "threshold;" and the reporting by that particular UE is "off" when that particular UE senses that that particular carrier becomes worse than the "threshold". In an embodiment, the UE reports an "on" or "off" flag based on comparing the sensed condition of the CC to the threshold it received from the eNB. Further, it is noted that an additional timer, such as a "TimerToTrigger" timer is set upon any change in condition due to a trigger event. The additional timer sets a minimum duration for which the condition remains. Then at block 240 the eNB receives reports from the UE(s) which carry results from the UE sensing of the carrier (s). If at block 230 sensing by the UE is not needed, or if the sensing results the eNB receives at block 240 are still insufficient to determine whether the CC in the unlicensed band is suitable, then optionally the operations continue at Phase 3. At block 245 there is a determining by the eNB whether more accurate reporting is needed for measured, detected, and/or pre-selected CCs of the unlicensed band. If more accurate reporting is needed then at block 255 the eNB sends a measurement type preamble on the configured carrier(s) that is within the unlicensed band. At block 260 the UE reads the measurement preamble on the CC(s), takes measurements on that CC and reports back to the eNB. Blocks 245/255/260 may be repeated at the eNB's discretion as needed to gather sufficient information about the CC to make a decision whether or not to take it into use. Once the decision is made at any one of blocks 225, 230, 240 or 245 that the CC is suitable, then at block 265 the eNB configures the CC in the unlicensed band as a Scell (i.e., secondary CC(s)) for the UE.

Figure 2B:
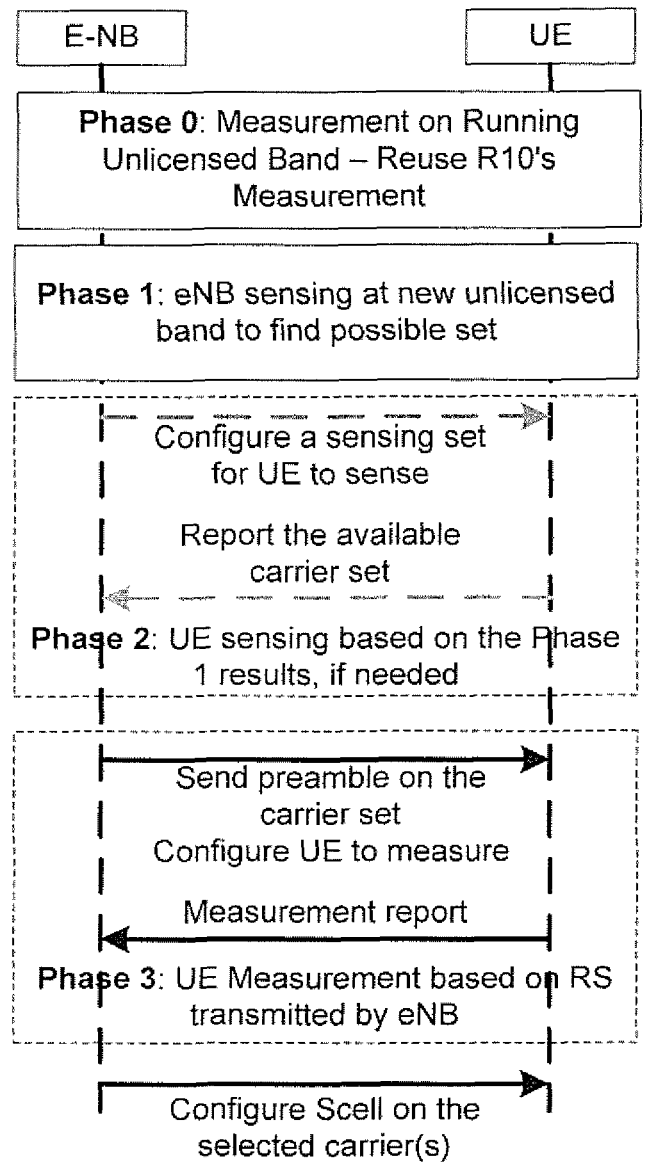
FIG. 2B illustrates simplified operations performed during Phases 0-3 by devices such as a base station and/or user equipment, in accordance with the exemplary embodiments of the invention.

FIG. 2B illustrates additional details the exemplary embodiments of the invention related to Phases 0-3 of the operations, as described above in FIG. 2A.

Firstly, if the eNB detected that an additional resource is needed to support data transmission, such as between UEs and/or between an eNB and UE(s), and there is no available resource on a licensed band, the eNB would check whether there is already a running CC for other UEs on the unlicensed band. If there is a carrier already running on the unlicensed band, the eNB should first configure the UE to do measurements on this unlicensed CC and report the measurements to the eNB. This measurement process is identified as being associated with Phase 0 in FIG. 2B.

Secondly, if there is no running carrier on the unlicensed band or the carrier running on the unlicensed band is not good enough, then as identified as a Phase 1 operation, the eNB itself should sense and/or pre-select at least one carrier from the unlicensed band. It is noted that this pre-selecting can be performed using information stored in an internal or external database, such information can include white space information and/or sensing results.

If the number of CCs pre-selected is larger than a predetermined amount and/or if eNB requires information regarding interference conditions of these CCs, such as a DL interference condition at the UE side, the eNB may configure the UE to perform sensing and or measuring. This sensing and/or measuring is being performed on particular pre-selected carriers in the unlicensed band. Then, as identified as being associated with Phase 2 in FIG. 2B, when the sensing is complete the UE should report the sensing results to the eNB to be used by the eNB to decide which carrier(s) are sufficiently available for the UE.

Finally, if the eNB wants to get a more accurate report for some of the CCs in the unlicensed band which have may have been sensed by the UE in Phase 2, the eNB could send a measurement type preamble on at least one of the carriers on the unlicensed band. The sending is identified as being associated with Phase 3 in FIG. 2B, and is configuring the UE to do measurement and reporting using the measurement type preamble. Based on at least a measurement report from the UE, the eNB ascertains with enhanced certainty whether the identified CC(s) in the unlicensed band is/are sufficiently available or not. Note that sensing in Phase 2 and measuring in Phase 3 are distinct; sensing may be for example the UE sensing transmit power or signal level on the CC and comparing to the threshold noted above with respect to FIG. 2A, whereas measuring gives more detailed information such as measuring the specific DL interference seen by the UE by reading a measurement preamble on the CC.

The operations of FIGS. 2A and 2B, as described above, may be fully controlled by the eNB. Therefore, in accordance with the exemplary embodiments of the invention, the eNB may decide to skip at least one step. For example, phases 2 and 3 are both optional in certain embodiments. That is to say, there is the possibility to enter block 240 or phase 3 directly from block 220 or phase 1. Further, the eNB can configure an unlicensed carrier right after block 230, or in one of Phase 1 or Phase 2 of the operations as at least illustrated in FIGS. 2A and 2B. In a non-limiting embodiment of the invention the decision regarding the skipping and/or ordering of these blocks can be made in consideration of the capabilities of either or both of the UE and the eNB.

In addition, the operations associated with Phases 0-3, as at least with regards to FIGS. 2A and 2B, are further detailed as follows:

Phase 0: the eNB configures the UE to do measurements on carrier(s) which are already running on unlicensed band:
Since CRS is already transmitted, the conventional LTE measurement mechanism can be re-used for this purpose, as adapted for the unlicensed band.
The inventors propose three options to decide whether the carrier in question is available:
Pre-define a fixed threshold and let the UE decide.
The UE then reports an On-Off flag to the eNB to indicate its decision whether the carrier is available or not.
The eNB semi-statically configures the threshold, but still lets the UE decide and report its On-Off flag as noted above.
Fully reuse the LTE-A mechanism, in which the UE reports RSRP/RSRQ to the eNB and the eNB decides whether the carrier is available or not.
For the first two options above in which the UE decides the carrier availability, there is also a need to define some report trigger event to let the UE report the On-Off flag of Phase 2 described with reference to the sensing of block 235 of FIG. 2A. In an exemplary embodiment:
For the "on" flag, the reporting trigger is the event A4 defined in [TS 36.331] re-used for this purpose, such as, "neighbor becomes better than threshold";
For the "off" flag, the reporting trigger is a newly defined event A7, such as "neighbor becomes worse than threshold"
The inventors also present two options to report the measurement result in Phase 3 described with reference to the measuring at block 260 of FIG. 2A:
Reporting the result via RRC message on the PUSCH on the cell with the RRC link, and/or
Reporting the result via the PUCCH which is explicitly configured on the Pcell. Below are two options for this PUCCH report.
Option I: The report for each carrier can be defined by reusing the periodic CQI report, and the report for each carrier is sent using TDM
Option II: Only use 1 or 2 bits to report for each carrier, and reports for all the carriers are jointly coded and send in PUCCH format IL
Phase 1: the eNB does its own measurements and/or sensing itself and chooses some carriers which have potential to be used; these are candidate carriers.
This phase is fully implemented only by the eNB side with no measurements from the UEs.
Phase 2: the eNB configures the UE to do the measurements and/or sensing and lets the UE report the results
In this embodiment there is defined a new sensing object, and a new trigger event for reporting:
i. For the "on" flag, there is defined the new event A8 "sensing carrier becomes better than threshold."
ii. For the "off" flag, there is defined a new event A9, such as "sensing carrier becomes worse than threshold."
The inventors further present two options for the UE to do the sensing, which may be UE-specific implementations:
i. Measuring common RSSI and comparing with the threshold to report the sensing result.
This requires the UE to introduce a new measurement capability of "common RSSI", such as measure all the power received from the carrier.
ii. Use an ISM technique to get the sensing result if there is an ISM module deployed at the UE already.
The reporting mechanism is the same as phase I.
Phase 3: the eNB sends a measurement preamble on the carrier in question, and lets the UE do the measurement on that carrier/preamble and report the measurement result
a conventional CRS can be used as the measurement preamble.
The procedure of phase 3 may be similar with phase 0 but with some differences in the parameters being utilized.

In accordance with the exemplary embodiments, sensing can be explained as at least one of: no running LTE system or LTE reference signal is transmitted in the unlicensed band. Additionally, sensing can be based on power detection of radio signals, regardless of whether the detected power is from transmissions within some wireless system(s) or just from white noise. In addition, in accordance with the embodiments, measuring can refer to a base station/eNB transmitting CRS, and a mobile device/UE measuring RSRP/RSRQ.

Figure 3:
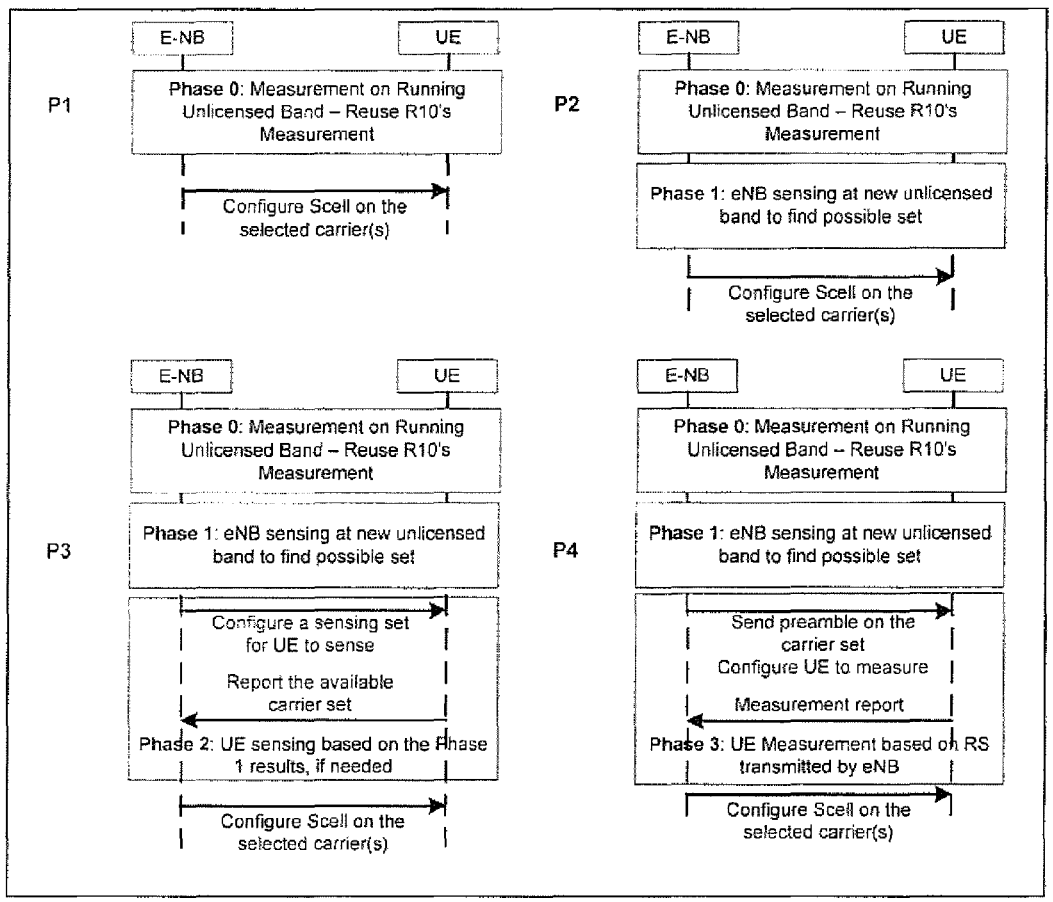
FIG. 3 illustrates simplified procedures using different combinations of the Phases 0-3, in accordance with non-limiting embodiments of the invention.

FIG. 3 illustrates procedures using different combinations of Phases, in accordance with non-limiting embodiments of the invention. These procedures P1-P4, as illustrated in FIG. 3, are described as follows:

In the procedure identified as P1, it can be seen that operations of Phase 0 are first performed including measuring CCs running in the unlicensed band and/or a reusing of R10's measurements. Thereafter in P1 there is configuring a secondary CC (Stell) on the selected carriers.

In the procedure identified as P2, operations of Phase 0 are first performed including measuring CCs running in the unlicensed band and/or a reusing of R10's measurements. Then operations of Phase 1 are performed including the eNB sensing and/or measuring an unlicensed band to determine one or more CCs of the unlicensed band. Thereafter, in P1 there is configuring a secondary CC (Scell) on selected carriers of the one or more CCs.

In the procedure P3, operations of Phase 0 are first performed including measuring CCs running in the unlicensed band and/or a reusing of R10's measurements. Then operations of Phase 1 are performed including the eNB sensing and/or measuring an unlicensed band to determine one or more CCs of the unlicensed band. Then there is configuring the UE to measure and/or sense a pre-determined set of CCs of the unlicensed band and report back to the eNB the CCs which are acceptable and/or available. These operations are further associated with Phase 2 in that, if needed, the UE can be sensing CCs sensed and/or measured by the eNB in Phase 1. Thereafter, in P3 a secondary CC (Scell) is configured on selected carriers of the one or more CCs.

In P4 operations of Phase 0 are first performed including measuring CCs running in the unlicensed band and/or a reusing of R10's measurements. Then operations of Phase 1 are performed including the eNB sensing and/or measuring an unlicensed band to determine one or more CCs of the unlicensed band. Then there is sending a signal including a measuring type preamble on at least one CC of the one or more CCs of the unlicensed band. The sending is configuring the UE to do measurement and reporting based on the signal including the measurement type preamble. These operations are further associated with Phase 3 in that, if needed, the UE can be sensing CCs sensed and/or measured by the eNB in Phase 1. Thereafter, in P4 a secondary CC (Scell) is configured on selected carriers of the one or more CCs.

It is noted that although a Phase and its procedures may be controlled by the eNB, the order in which the implemented Phases are performed is in an exemplary embodiment be based on the above numerical order of the Phases. In this embodiment it would be allowable for the eNB to use only Phases 0, 1, and 3, in that order, as illustrated in FIG. 3 as the P4 operations. However, if the eNB also uses phase 2 in this embodiment it follows that the eNB uses phase 2 and thereafter phase 3 so the operations include Phases 0, 1, 2, and 3 in numerical order.

Further, the exemplary embodiments of the invention can be summarized as follows:

Embodiment #1: The overall procedure (especially the signaling part of phase2 and phase3) for sensing and measurement, as at least described in FIGS. 2A and 2B, which may be specifically defined in 3GPP standards if this embodiment is accepted as such.

Embodiment #2: for phase 0
  i. #2a: this comprises a new trigger event A7 "neighbor becomes worse than threshold"
  ii. #2b: this comprises a new report format, such as a one data bit identifying availability of an unlicensed band. If by example the one data bit may be defined so that value "1" stands for "available" and value "0" stands for "un-available", or vice versa. The one data bit may be disposed in an RRC message based on a trigger or periodic report on a PUCCH to report the measurement result. It is noted that a report for each carrier can be sent using TDM or jointly coded in this case.

Embodiment #3: for phase 2
  i. #3a: in this embodiment there is defined the new measurement capability "common RSSI" for Rel-11 and beyond UE in PHY spec and define new quantity configuration in RRC spec.
  ii. #3b: in this embodiment the UE uses its ISM module to obtain its measurement and the UE generates the sensing report if there is interference from another ISM device.
  iii. #3c: this embodiment introduces the new trigger event A8: "sensing carrier becomes better than threshold" and new trigger event A9: "sensing carrier becomes worse than threshold". For more easy adoption these events should be defined for Rel-11 and beyond for the UE side.

In the overall procedures, other than in Phase 1, each phase can reuse existing LTE measurement configuration procedures. However, it is noted that new measurement object(s), reporting trigger event(s), and reporting formats may still need to be defined.

In FIGS. 4a-e there are illustrated coding which is related to information elements (IE) for RRC messaging and reporting trigger events as in accordance with the embodiments of the invention.

For example, as illustrated in FIG. 4a there is a MeasObjectUnlicensedBand information element. In FIG. 4a the MeasObjectUnlicensedBand specifies information applicable for measurement/sensing on unlicensed band. Here, "carrierFreq" stands for the central frequency of the sensing carrier on the unlicensed band, and "allowedMeasBandwidth" stands for the bandwidth of the sensing carrier.

The IE MeasObjectUnlicensedBand information element, as illustrated in FIG. 4a, comprises code as follows;

```
-- ASN1START
    MeasObjectUnlicensdBand ::=    SEQUENCE {
      carrierFreq                  ARFCN-ValueUnlicensedBand,
      allowedMeasBandwidth         AllowedMeasBandwidth,
```

As illustrated in FIG. 4b, there is a QuantityConfig information element. In FIG. 4b the IE QuantityConfig specifies the measurement quantities and layer 3 filtering coefficients for E-UTRA and inter-RAT measurements.

The IE 1.1.1.1 QuantityConfig, as illustrated in FIG. 4b, comprises code as follows:

```
-- ASN1START
quantityConfigUnLicensedBand    QuantityConfigUnlicenseBand
    OPTIONAL,    -- Need ON
QuantityConfigUnlicensedBand ::=SEQUENCE {
    MeasQuantityUnlicensedBand    ENUMERATED {common-rssi}
```

Further, FIG. 4c illustrates a trigger event A7 at a threshold in accordance with the exemplary embodiments of the invention. In this case, the reporting trigger event A7 is when "neighbor becomes worse as identified with the threshold.

The "1.1.1.2 Event A7 (Neighbour becomes worse than threshold)," as illustrated in FIG. 4c, can comprise coding as follows:

The UE shall:
  1>consider the entering condition for this event to be satisfied when condition A8-1, as specified below, is fulfilled;
  1>consider the leaving condition for this event to be satisfied when condition A8-2, as specified below, is fulfilled;

Inequality A7-1 (Entering Condition)

$$Mn+Ofn+Ocn-Hys<\text{Thresh}$$

Inequality A7-2 (Leaving Condition)

$$Mn+Ofn+Ocn+Hys>\text{Thresh}$$

The variables in the formula are defined as follows:
  Mn is the measurement result of the neighbouring cell, not taking into account any offsets.
  Ofn is the frequency specific offset of the frequency of the neighbour cell (i.e. offsetFreq as defined within measObjectEUTRA corresponding to the frequency of the neighbour cell).
  Ocn is the cell specific offset of the neighbour cell (i.e. cellIndividualOffset as defined within measObject-EUTRA corresponding to the frequency of the neighbour cell), and set to zero if not configured for the neighbour cell.
  Hys is the hysteresis parameter for this event (i.e. hysteresis as defined within reportConfigEUTRA for this event).

In addition, FIG. 4d illustrates a trigger event A8 at a threshold in accordance with the exemplary embodiments of the invention. In this case the reporting trigger event A8 identifies that a carrier of an unlicensed band has become better than a threshold, such as an absolute threshold.

The "1.1.1.3 Event A8 (measured and/or sensed carrier on unlicensed band becomes better than absolute threshold)" as illustrated in FIG. 4d comprises coding as follows:
The UE shall:
1>consider the entering condition for this event to be satisfied when condition A9-1, as specified below, is fulfilled;
1>consider the leaving condition for this event to be satisfied when condition A9-2, as specified below, is fulfilled;
Inequality A8-1 (Entering condition)

Then, FIG. 4e illustrates a trigger event A9 at a threshold in accordance with an exemplary embodiment of the invention. Here, the reporting trigger event A9 identifies that a carrier of an unlicensed band has become worse than a threshold, such as an absolute threshold.

The "1.1.1.4 Event A9 (measured and/or sensed carrier on unlicensed band becomes worse than absolute threshold)" as illustrated in FIG. 4e can comprise coding as follows:
The UE shall:
1>consider the entering condition for this event to be satisfied when condition A9-1, as specified below, is fulfilled;
1>consider the leaving condition for this event to be satisfied when condition A9-2, as specified below, is fulfilled;
Inequality A9-1 (Entering Condition)

$Mn-Hys<Thresh$

Inequality A9-2 (Leaving Condition)

$Mn+Hys>Thresh$

Figure 5:
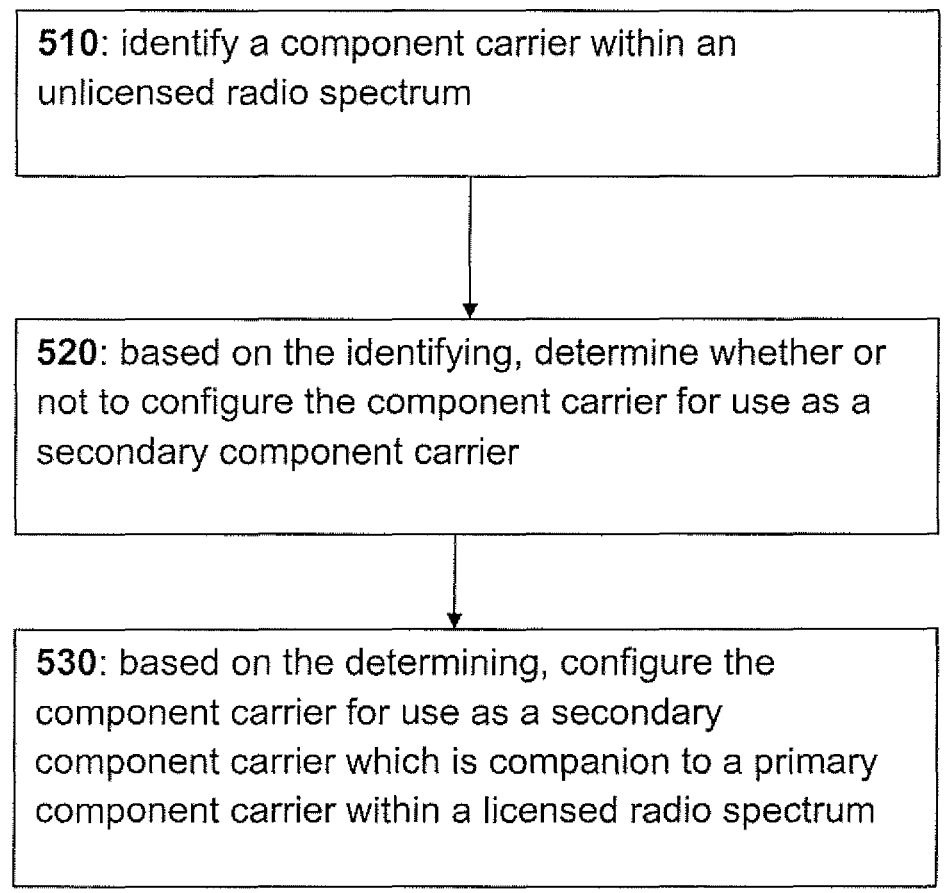
FIGS. 5 and 6 are logic flow diagrams which illustrate the operation of a method, and a result of execution of computer program instructions embodied on a computer readable memory, in accordance with the exemplary embodiments of this invention.

In FIG. 5 there is illustrated a logic flow diagram which describes an exemplary embodiment of the invention in a manner which may be from the perspective of the eNB. FIG. 5 may be considered to illustrate the operation of a method, and a result of execution of a computer program stored in a computer readable memory, and a specific manner in which components of an electronic device are configured to cause that electronic device to operate. The various blocks shown in FIG. 5 may also be considered as a plurality of coupled logic circuit elements constructed to carry out the associated function(s), or specific result of strings of computer program code stored in a memory.

In block 510 of FIG. 5 a component carrier within an unlicensed radio spectrum is identified. In block 520 of FIG. 5 based on the identifying, it is determined whether or not to configure the component carrier for use as a secondary component carrier. Then in block 530 of FIG. 5, based on the determining, the component carrier is configured for use as a secondary component carrier. This secondary component carrier is then companion to a primary component carrier which is within a licensed radio spectrum.

Further, in accordance with the paragraph above, sending a measurement reference on the selected at least one component carrier to a mobile device, where the determining is based on a reply from the mobile device according to the measurement reference.

In accordance with the paragraph above, the measurement reference is one of a cell specific reference identified in a phase 0 of the operations or a measurement preamble sent to the mobile device in a phase 3 of the operations.

Additionally, in accordance with the preceding paragraphs, the reply comprises a common received signal strength indicator which is the power detection results of all the radio power collected in the configured sensing frequency.

Further, in accordance with the preceding paragraph, the selected at least one component carrier is one of at least one component carrier running on the unlicensed radio spectrum for a phase 1 of the operations or a pre-selected subset of at least one component carrier on the unlicensed radio spectrum in a phase 2 and a phase 3 of the operations, where the pre-selected subset is identified using a database associated with the base station.

Additionally, in accordance with the preceding paragraph, the selecting the at least one component carrier within the unlicensed radio spectrum comprises sensing at least one component carrier within the unlicensed radio spectrum by the base station in a phase 1 of the operations.

Furthermore, in accordance with the preceding claims, the phase 2 and the phase 3 of the operations are optional, and a device performing the method as stated above is caused to perform phases of the operations in a numerical order of the phases.

The operations in any one of the preceding claims performed by a network node of a long term evolution advanced network.

In accordance with the preceding paragraphs, at least one of the identifying and the determining comprises: sensing, by the network access node, an available component carrier within the unlicensed radio spectrum; configuring at least one mobile device to report measurements results on an available component carrier within the unlicensed radio spectrum; and configuring at least one mobile device to report measurements results on an available component carrier within the unlicensed radio spectrum.

Further, in accordance with the preceding paragraph, the configuring the at least one mobile device comprises one of: sending on a configured component carrier within an unlicensed radio spectrum a message comprising a preamble used to pre-define one or more of a fixed or semi-statically configured threshold to prompt a mobile device to report measurements on the available component carrier, and reusing, with a cell specific reference signal, a mechanism of the long term evolution network to configure the mobile device to report measurements on the available component carrier.

In accordance with the preceding paragraph, the pre-defining the one or more threshold comprises a defined trigger reporting event such that reporting by a mobile device is "on" when sensing that the component carrier becomes better than the "threshold," and last for a certain time and reporting by a mobile device is "off" when sensing that the component carrier becomes worse than the "threshold." and last for a certain time In accordance with the preceding paragraph, the trigger reporting event remains in the "on" or the "off" condition for at least a duration determined by a separate trigger timer.

Additionally, in accordance with the preceding paragraphs, the reporting is receive via one of a radio resource control message over the component carrier or channel quality indicator report signaling.

In accordance with the preceding paragraphs, the channel quality indicator report signaling uses data fields comprising one or two bits to identify component carriers within the unlicensed radio spectrum to which the report is applicable.

In accordance with the preceding paragraphs, the measurements comprise a common received signal strength indicator to indicate all power received from the component carrier within the unlicensed radio spectrum.

Figure 6:
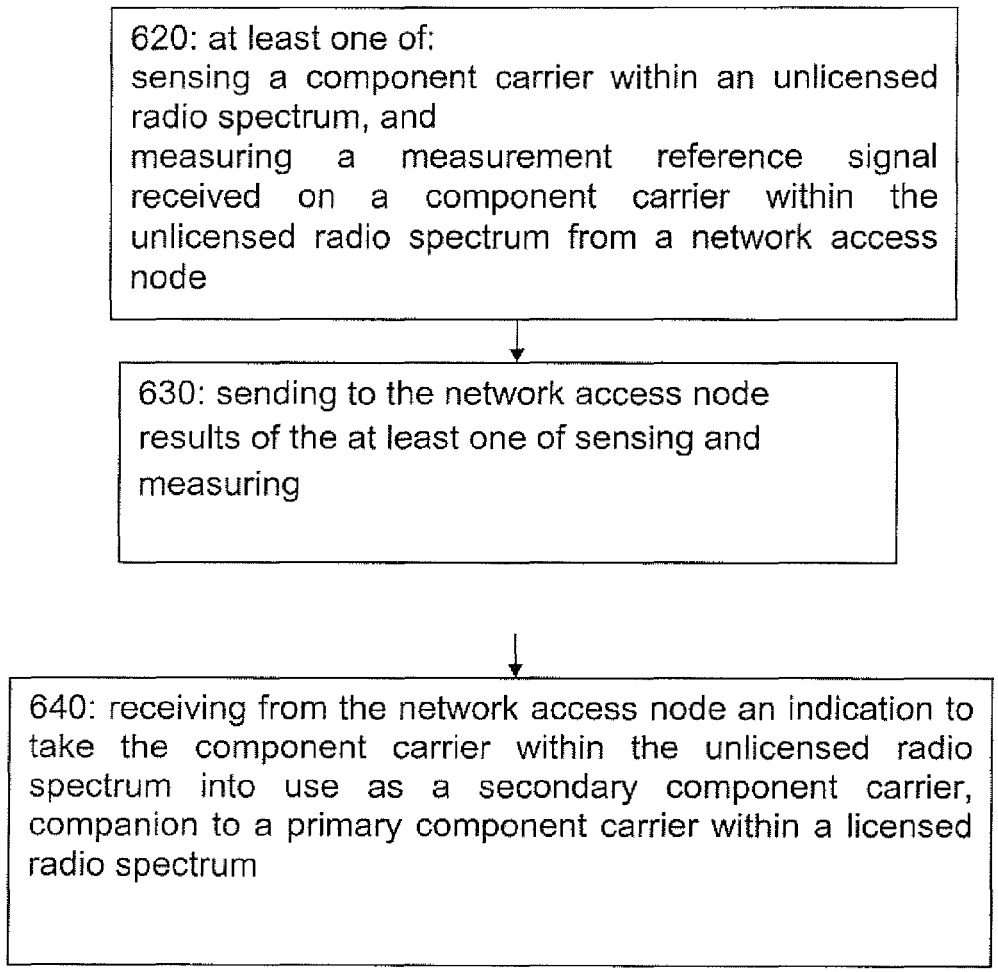

FIG. 6 similarly illustrates a logic flow diagram. The logic flow illustrated in FIG. 6 describes an exemplary embodiment of the invention in a manner which may be from the perspective of a mobile device, such as a user equipment. FIG. 6 may be considered to illustrate the operation of a method, and a result of execution of a computer program stored in a computer readable memory, and a specific manner in which components of an electronic device are configured to cause that electronic device to operate. The various blocks shown in FIG. 6 may also be considered as a plurality of coupled logic circuit elements constructed to carry out the associated function(s), or specific result of strings of computer program code stored in a memory.

In block 610 of FIG. 6 there is performed at least one of sensing a component carrier within an unlicensed radio spectrum, and measuring a measurement reference signal received from a network access node on a component carrier within the unlicensed radio spectrum. In block 620 of FIG. 6 there is sent to the network access node results of the at least one of sensing and measuring. Then in block 630 of FIG. 6, there is received from the network access node an indication to take the component carrier within the unlicensed radio spectrum into use as a secondary component carrier by the mobile device. In this embodiment the secondary component carrier is taken into use companion to a primary component carrier which is itself within licensed radio spectrum.

In accordance with the preceding paragraph, comprising receiving from the network access node a preamble used to pre-define one of a fixed or semi-statically configured at least one threshold to prompt the mobile device to report measurements on the available component carrier.

In accordance with the preceding paragraphs, the message to the network access node comprises channel quality indicator report signaling which uses data fields comprising one or two bits to identify component carriers within the unlicensed radio spectrum to which the report is applicable.

Further, in accordance with the preceding paragraphs, the message to the network access node is sent in response to a reporting event trigger of the mobile device being set to "on" due to a threshold trigger indicating that a component carrier has become better than a predefined threshold.

In addition, in accordance with the preceding paragraphs, the message to the network access node comprises a common received signal strength indicator to indicate all power received from the component carrier within the unlicensed radio spectrum.

In accordance with the preceding paragraphs, the mobile device comprises a module which is capable of transmitting in the industrial, scientific and medical band, which is unlicensed radio spectrum; the method further comprising using the industrial, scientific and medical module to at least one of sense and measure a component carrier within the unlicensed radio spectrum.

Figure 7:
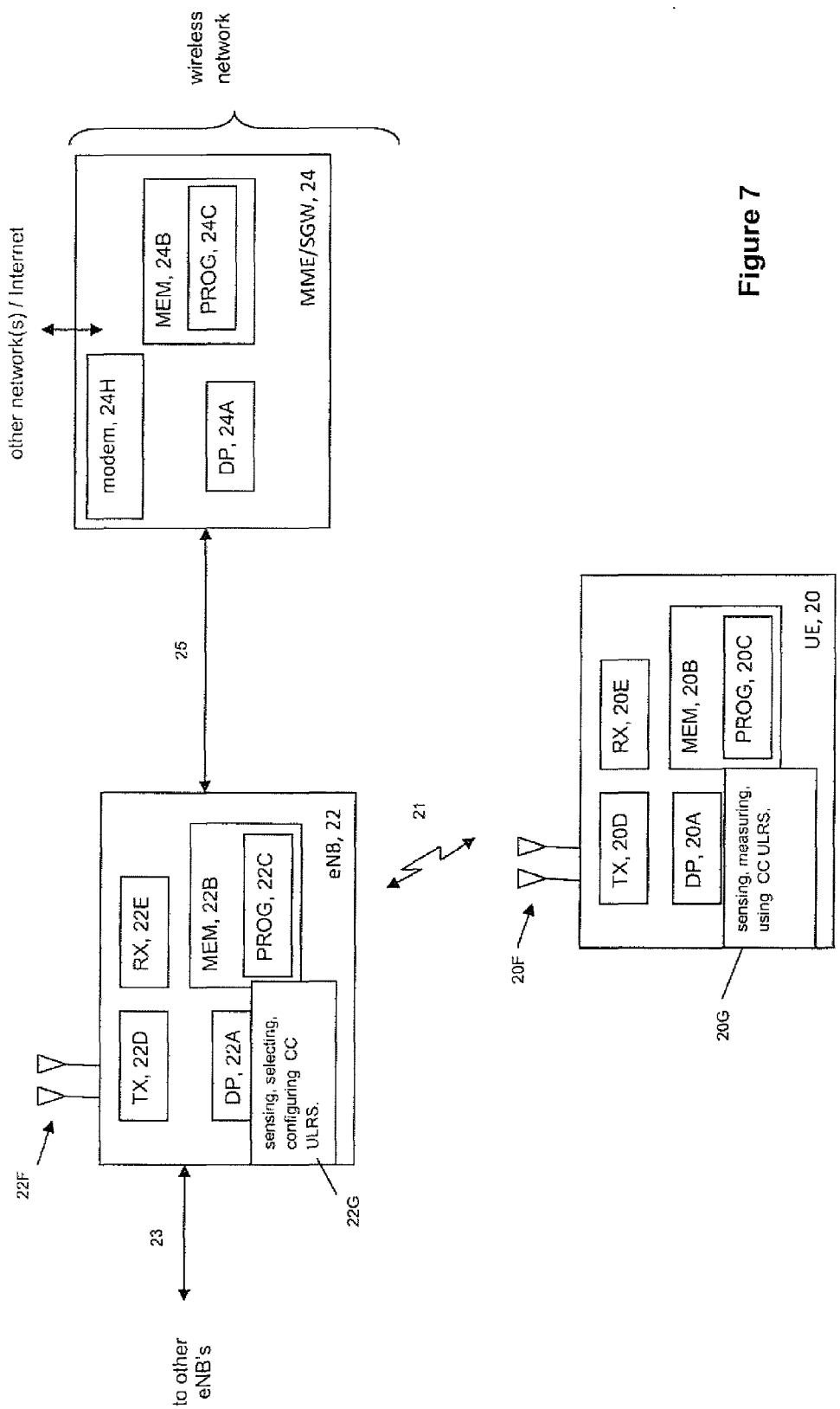
FIG. 7 is a simplified block diagram of the UE in communication with a wireless network illustrated as an eNB and a serving gateway SGW, which are an example of exemplary electronic devices suitable for use in practicing the exemplary embodiments of this invention.

Reference is now made to FIG. 7 for illustrating a simplified block diagram of various electronic devices and apparatus that are suitable for use in practicing the exemplary embodiments of this invention. In FIG. 7 a wireless network (eNB 22 and mobility management entity MME/serving gateway SGW 24) is adapted for communication over a wireless link 21 with an apparatus, such as a mobile terminal or UE 20, via a network access node, such as a base or relay station or more specifically an eNB 22. The network may include a network control element MME/SGW 24, which provides connectivity with further networks (e.g., publicly switched telephone network (PSTN) and/or a data communications network/Internet).

The UE 20 includes processing means such as at least one data processor (DP) 20A, storing means such as at least one computer-readable memory (MEM) 20B storing at least one computer program (FROG) 20C, communicating means such as a transmitter TX 20D and a receiver RX 20E for bidirectional wireless communications with the eNB 22 via one or more antennas 20F. Also stored in the MEM 20B at reference 20G is at least one algorithm which the UE 20 utilizes to perform operations including, but not limited to, sensing, measuring, reporting on and using component carriers of an unlicensed radio spectrum or band.

The eNB 22 also includes processing means such as at least one data processor (DP) 22A, storing means such as at least one computer-readable memory (MEM) 22B storing at least one computer program (PROG) 22C, and communicating means such as a transmitter TX 22D and a receiver RX 22E for bidirectional wireless communications with the UE 20 via one or more antennas 22F. There is a data and/or control path 25 coupling the eNB 22 with the MME/SGW 24, and another data and/or control path 23 coupling the eNB 22 to other eNB's/access nodes. Also stored in the MEM 22B at reference 22G is at least one algorithm which the eNB 22 utilizes to perform operations including, but not limited to, sensing, measuring, identifying, setting thresholds, and creating measurement type preambles for utilization of, such as by itself or other network nodes, component carriers of an unlicensed radio spectrum or band.

Similarly, the MME/SGW 24 includes processing means such as at least one data processor (DP) 24A, storing means such as at least one computer-readable memory (MEM) 24B storing at least one computer program (FROG) 24C, and communicating means such as a modem 24H for bidirectional wireless communications with the eNB 22 via the data/control path 25. While not particularly illustrated for the UE 20 or eNB 22, those devices are also assumed to include as part of their wireless communicating means a modem which may be inbuilt on an RF front end chip within those devices 20, 22 and which also carries the TX 20D/22D and the RX 20E/22E.

At least one of the PROGs 20C in the UE 20 is assumed to include program instructions that, when executed by the associated DP 20A, enable the device to operate in accordance with the exemplary embodiments of this invention, as detailed above. The eNB 22 and MME/SGW 24 may also have software to implement certain aspects of these teachings. In these regards the exemplary embodiments of this invention may be implemented at least in part by computer software stored on the MEM 20B, 22B which is executable by the DP 20A of the UE 20 and/or by the DP 22A of the eNB 22, or by hardware, or by a combination of tangibly stored software and hardware (and tangibly stored firmware). Electronic devices implementing these aspects of the invention need not be the entire UE 20 or eNB 22, but exemplary embodiments may be implemented by one or more components of same such as the above described tangibly stored software, hardware, firmware and DP, or a system on a chip SOC or an application specific integrated circuit (ASIC).

In general, the various embodiments of the UE 20 can include, but are not limited to personal portable digital devices having wireless communication capabilities, including but not limited to cellular telephones, navigation devices, laptop/palmtop/tablet computers, digital cameras and music devices, and Internet appliances.

Various embodiments of the computer readable MEMs 20B and 22B include any data storage technology type which is suitable to the local technical environment, including but not limited to semiconductor based memory devices, magnetic memory devices and systems, optical memory devices and systems, fixed memory, removable memory, disc memory, flash memory, DRAM, SRAM, EEPROM and the like. Various embodiments of the DPs 20A and 22A include but are not limited to general purpose computers, special purpose computers, microprocessors, digital signal processors (DSPs) and multi-core processors.

The exemplary embodiments of the invention as stated above at least provide at the advantages of defining practical measurement and sensing procedures for utilizing unlicensed bands in a communications system, such as an LTE system, the measurement and sensing procedures being aligned with the current 3GPP LTE release. In addition, the embodiments as described above provide robust results for use in the sensing and measurement and minimize signaling overhead by limiting reporting to on-off flag indications. Further, the ENB has enough flexibility to control the whole procedure in order to reduce delay and/or increase robustness, and the UE has the flexibility regarding generating a report based on its own capability.

Various modifications and adaptations to the foregoing exemplary embodiments of this invention may become apparent to those skilled in the relevant arts in view of the foregoing description. While the exemplary embodiments have been described above in the context of the E-UTRAN system, it should be appreciated that the exemplary embodiments of this invention are not limited for use with only this one particular type of wireless communication system, and that they may be used to advantage in other wireless communication systems such as for example UTRAN, GERAN and GSM and others so long as there are different carriers operating on different timing which might be assigned to a UE.

Further, some of the various features of the above non-limiting embodiments may be used to advantage without the corresponding use of other described features. The foregoing description should therefore be considered as merely illustrative of the principles, teachings and exemplary embodiments of this invention, and not in limitation thereof.

The invention claimed is:

1. An apparatus, comprising:
    circuitry configured to:
        sense a component carrier within an unlicensed radio spectrum based on information stored in a database;
        configure at least one mobile device to report sensing results of the component carrier within the unlicensed radio spectrum, the sensing results based on the at least one mobile device performing a first measurement of sensing a transmit power or signal level on the component carrier and comparing the sensed transmit power or signal level to a threshold;
        when the sensed transmit power or signal level reported by the at least one mobile device is greater than the threshold, send to the at least one mobile device on the component carrier within the unlicensed radio spectrum a cell specific reference signal and configure the at least one mobile device to report measurement results of a downlink interference seen by the at least one mobile device on the component carrier within the unlicensed radio spectrum based on performing a second measurement of a parameter of the cell specific reference signal;
        based on the measurement results, determine whether or not to configure the component carrier for use as a secondary component carrier; and
        based on the determining, configure the component carrier for use as a secondary component carrier companion to a primary component carrier within a licensed radio spectrum.

2. The apparatus according to claim 1, wherein the circuitry is configured to cause the apparatus to configure the at least one mobile device by at least one of:
    sending to the at least one mobile device an indication of the threshold by which to report the first measurement results.

3. The apparatus according to claim 2, wherein the circuitry is configured to cause the apparatus to send to the mobile device a timer trigger which indicates a duration during which the threshold is valid, to receive from the mobile device the first measurement results, and to interpret an on flag in the first measurement results as the component carrier within the unlicensed radio spectrum being available for use or an off flag in the first measurement results as the component carrier within the unlicensed radio spectrum not available for use.

4. The apparatus according to claim 1, wherein the measurement results are received via one of a radio resource control message on the component carrier within the unlicensed radio spectrum or in channel quality indicator report signaling.

5. The apparatus according to claim 4, wherein the channel quality indicator report signaling uses data fields comprising one or two bits to identify the component carrier within the unlicensed radio spectrum to which the report is applicable.

6. The apparatus according to claim 1, wherein the first measurement results comprise a common received signal strength indicator which indicates all power received from the component carrier within the unlicensed radio spectrum.

7. A method implemented by an apparatus, comprising:
    sensing, by circuitry of the apparatus, a component carrier within an unlicensed radio spectrum based on information stored in a database;
    configuring at least one mobile device to report sensing results of the component carrier within the unlicensed radio spectrum, the sensing results based on the at least one mobile device performing a first measurement of sensing a transmit power or signal level on the component carrier and comparing the sensed transmit power or signal level to a threshold;
    when the sensed transmit power or signal level reported by the at least one mobile device is greater than the threshold, sending to the at least one mobile device on the component carrier within the unlicensed radio spectrum a cell specific reference signal and configuring the at least one mobile device to report measurement results of a downlink interference seen by the at least one mobile device on the component carrier within the unlicensed radio spectrum based on performing a second measurement of a parameter of the cell specific reference signal;
    based on the measurement results, determining whether or not to configure the component carrier for use as a secondary component carrier; and
    based on the determining, configuring the component carrier for use as a secondary component carrier companion to a primary component carrier within a licensed radio spectrum.

8. The method according to claim 7, wherein configuring the at least one mobile device comprises one of:
    sending to the at least one mobile device a message the threshold by which to report the first measurement results.

9. The method according to claim 8, further comprising sending to the at least one mobile device a timer trigger which indicates a duration during which the threshold is valid;
    receiving from the mobile device the first measurement results; and interpreting an on flag in the first measurement results as the component carrier within the unlicensed radio spectrum being available for use or an off flag in the first measurement results as the component carrier within the unlicensed radio spectrum not available for use.

10. The method according to claim 7, further comprising receiving the measurement results via one of a radio resource control message on the component carrier within the unlicensed radio spectrum or channel quality indicator report signaling.

11. The method according to claim 10, wherein the received channel quality indicator report signaling uses data fields comprising one or two bits to identify the component carrier within the unlicensed radio spectrum to which the report is applicable.

12. The method according to claim 7, wherein the first measurement results comprise a common received signal strength indicator which indicates all power received from the component carrier within the unlicensed radio spectrum.

13. An apparatus, comprising:
    circuitry configured to:
        sense results of a component carrier within an unlicensed radio spectrum, the sensing results based on performing a first measurement of sensing a transmit power or signal level on the component carrier, and compare the sensed transmit power or signal level to a threshold;
        when the sensed transmit power or signal level is greater than the threshold, receive on the component carrier within the unlicensed radio spectrum a cell specific reference signal and measure downlink interference seen on the component carrier within the unlicensed radio spectrum based on performing a second measurement of a parameter of the cell specific reference signal;
        send to a network access node the measurement results; and
        receive from the network access node an indication to take the component carrier within the unlicensed radio spectrum into use as a secondary component carrier companion to a primary component carrier within a licensed radio spectrum.

14. The apparatus according to claim 13, further comprising receiving from the network access node an indication of the threshold, and the first measurement results comprise an on flag for indicating the component carrier within the unlicensed radio spectrum is available for use or an off flag indicating the component carrier within the unlicensed radio spectrum is not available for use.

15. The apparatus according to claim 13, wherein the measurement results are sent to the network access node via one of a radio resource control message on the component carrier within the unlicensed radio spectrum or in channel quality indicator report signaling which uses data fields comprising one or two bits to identify the component carrier within the unlicensed radio spectrum to which the report is applicable.

16. The apparatus according to claim 13, wherein the first measurement results that are sent to the network access node comprises a common received signal strength indicator which indicates all power sensed on the component carrier within the unlicensed radio spectrum.

17. The apparatus according to claim 13, wherein the apparatus further comprises a module capable of transmitting in the industrial, scientific and medical band, and wherein the circuitry causes the apparatus to at least one of sense and measure the component carrier within the unlicensed radio spectrum utilizing a transmission from the module.

18. A method, implemented by an apparatus, comprising:
    sensing, by circuitry of the apparatus, results of a component carrier within an unlicensed radio spectrum, the sensing results based on a first measurement of sensing a transmit power or signal level on the component carrier, and compare the sensed transmit power or signal level to a threshold;
    when the sensed transmit power or signal level is greater than the threshold, receiving on the component carrier within the unlicensed radio spectrum a cell specific reference signal and measuring downlink interference seen on the component carrier within the unlicensed radio spectrum based on performing a second measurement of a parameter of the cell specific reference signal;
    sending to the network access node the measurement results; and
    receiving from the network access node an indication to take the component carrier within the unlicensed radio spectrum into use as a secondary component carrier companion to a primary component carrier within a licensed radio spectrum.

19. The method according to claim 18, further comprising receiving from the network access node an indication of the threshold, and the first measurement results comprise an on flag for indicating the component carrier within the unlicensed radio spectrum is available for use or an off flag indicating the component carrier within the unlicensed radio spectrum is not available for use.

20. The method according to claim 18, wherein the measurement results are sent to the network access node via one of a radio resource control message on the component carrier within the unlicensed radio spectrum or in channel quality indicator report signaling which uses data fields comprising one or two bits to identify the component carrier within the unlicensed radio spectrum to which the report is applicable.

21. The method according to claim 18, wherein the first measurement results that are sent to the network access node comprises a common received signal strength indicator to indicate all power sensed on the component carrier within the unlicensed radio spectrum.

22. The method according to claim 18, further comprising utilizing a module of a mobile device to transmit in the industrial, scientific and medical band and sensing or measuring the transmission from the module.

* * * * *